(No Model.)
J. W. PRICE.
RANGE FINDER FOR FIELD GLASSES.
No. 586,667. Patented July 20, 1897.
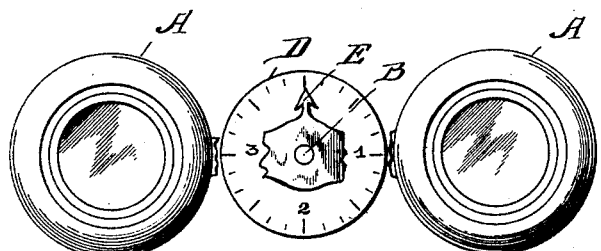
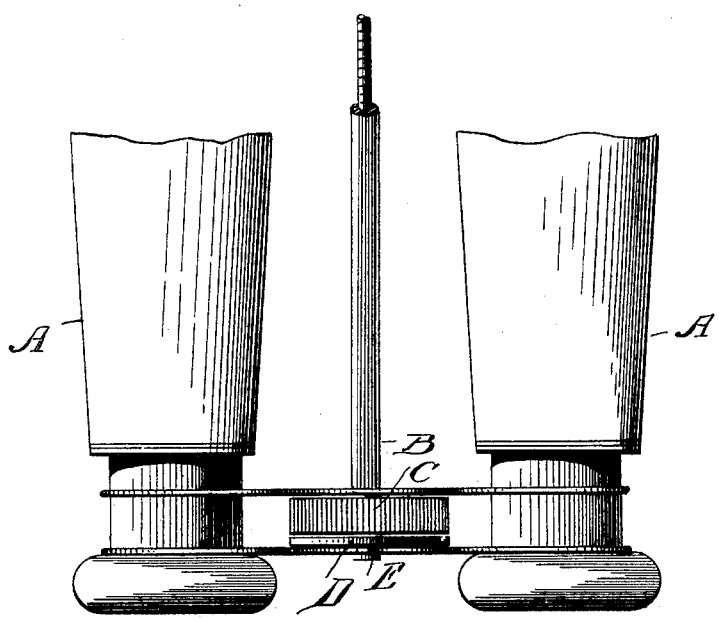
WITNESSES
INVENTOR
John W. Price.
by John Wedderburn
Attorney

UNITED STATES PATENT OFFICE.

JOHN W. PRICE, OF ATTICA, OHIO.

RANGE-FINDER FOR FIELD-GLASSES.

SPECIFICATION forming part of Letters Patent No. 586,667, dated July 20, 1897.

Application filed September 1, 1896. Serial No. 604,572. (No model.)

*To all whom it may concern:*

Be it known that I, JOHN W. PRICE, a citizen of the United States, residing at Attica, in the county of Seneca and State of Ohio, have invented certain new and useful Improvements in Range-Finders for Field-Glasses; and I do hereby declare the following to be a full, clear, and exact description of the invention, such as will enable others skilled in the art to which it appertains to make and use the same.

My invention relates to improvements in range-finders for field-glasses.

It consists, essentially, in mounting a dial or disk upon the adjusting-screw of the same, and a fixed pointer which will indicate thereon the range corresponding to any adjustment of the glasses.

In the drawings, Figure 1 is an end elevation of a pair of glasses with my device attached thereto, a portion of the connecting-bar between the glasses at the eye end being removed. Fig. 2 is a plan view of the same.

The object of my invention is to provide a device for attaching to ordinary field-glasses that will enable the user to tell at once the approximate distance of any object seen therethrough.

The tops of the telescope or glasses are represented by A. Between these is always placed an adjustable screw B. This screw carries a small wheel C, by which it may be readily turned to focus the glasses for different distances. Mounted upon this screw, but at such a distance therefrom as not to interfere with the use of the adjustable wheel C, is a dial-plate D. This dial-plate is attached to revolve with the rod B. It has laid out upon one face thereof a scale corresponding to miles. A fixed pointer E is mounted upon the glasses, so that the adjustment may be indicated upon the dial D.

It is a well-known fact that glasses must be adjusted differently for different distances. In changing from a close range to a long range their length is varied considerably. Each point in this adjustment corresponds to a certain distance of focus. Now if a scale or dial, such as D, be laid off to correspond to this ratio between the adjustment and the focus of the glasses the distance of the object viewed may be readily told by reference to this dial. This is the principle upon which my device is based. In using the same the glasses will be focused upon any object and the distance thereof may then be immediately seen by reference to the dial-plate.

The dial-plate will be laid out to correspond with distances from "zero," corresponding to one extreme adjustment thereof, to any convenient adjustment within the range of the glasses. This device will be found of great benefit in many uses—as, for instance, for military and naval officers. It will also be a useful and desirable attachment for the use of tourists.

It will be further noted that a field-glass having this improvement can be used to find the speed of an advancing or retracting object—for instance, by finding the distance of the object at timed intervals.

Having thus described my invention, what I claim as new, and desire to secure by Letters Patent, is—

A range-finder for field-glasses consisting of a flat plate rigidly attached to the adjusting-screw near the rear end thereof, and a fixed pointer secured to the frame of the glasses and adjacent to said plate, said plate being subdivided to correspond with the focus of the glasses.

In testimony whereof I have signed this specification in the presence of two subscribing witnesses.

JOHN W. PRICE.

Witnesses:
  CHAS. C. SUTTON,
  C. A. FORCE.